(12) United States Patent
Schwartz et al.

(10) Patent No.: US 11,915,053 B2
(45) Date of Patent: Feb. 27, 2024

(54) INTERRUPTION PREDICTIONS FOR CLOUD COMPUTE INSTANCES

(71) Applicant: NetApp, Inc., Sunnyvale, CA (US)

(72) Inventors: Idan Schwartz, Tel Aviv (IL); Ohad Muchnik, Tel Aviv (IL); Jonathan Cohen, Tel Aviv (IL); Kevin McGrath, Vienna, VA (US); Amiram Shachar, Las Vegas, NV (US)

(73) Assignee: NETAPP, INC., San Jose, CA (US)

( * ) Notice: Subject to any disclaimer, the term of this patent is extended or adjusted under 35 U.S.C. 154(b) by 154 days.

(21) Appl. No.: 17/206,871

(22) Filed: Mar. 19, 2021

(65) Prior Publication Data

US 2022/0129322 A1  Apr. 28, 2022

Related U.S. Application Data

(60) Provisional application No. 63/105,947, filed on Oct. 27, 2020.

(51) Int. Cl.
*G06F 9/50* (2006.01)
*G06F 9/48* (2006.01)

(52) U.S. Cl.
CPC .......... *G06F 9/5038* (2013.01); *G06F 9/4887* (2013.01); *G06F 9/505* (2013.01); *G06F 9/5072* (2013.01); *G06F 2209/503* (2013.01)

(58) Field of Classification Search
CPC ...... G06F 9/5038; G06F 9/4887; G06F 9/505; G06F 9/5072; G06F 2209/503; G06F 9/5088; G06N 20/20
See application file for complete search history.

(56) References Cited

U.S. PATENT DOCUMENTS 10,994,198 B1 * 5/2021 Byskal .................. A63F 13/358
2016/0321115 A1   11/2016 Thorpe et al.
(Continued)

OTHER PUBLICATIONS

Ekwe-Ekwe et al. "Location, Location, Location: Exploring Amazon EC2 Spot Instance Pricing Across Geographical Regions—Extended Version," Jul. 27, 2018. (Year: 2018).*
(Continued)

*Primary Examiner* — Sisley N Kim
(74) *Attorney, Agent, or Firm* — HAYNES AND BOONE, LLP (57) ABSTRACT

Systems, methods, and machine-readable media for predicting interruptions to the use of spare cloud resources and rebalancing based on those predictions are disclosed. A computing platform collects data for customers over time. The computing platform runs a machine learning algorithm on the historical data to generate a prediction classifier. The prediction classifier relates to a time window for prediction into the future, on the order of minutes or hours. The prediction classifier is run on monitored data from ongoing activity with a cloud provider to generate a risk score. Each risk score may identify an amount of risk that a spare cloud resource related to new resource metrics data will be interrupted within the future time frame corresponding to that prediction classifier. If predicted to be interrupted, the customer may be assisted in rebalancing to other resources. As a result, interruptions can be predicted hours into the future.

20 Claims, 6 Drawing Sheets

(56) References Cited

U.S. PATENT DOCUMENTS

2018/0375787 A1    12/2018    Chen et al.
2021/0400075 A1*   12/2021    Stergioudis ......... H04L 63/1433

OTHER PUBLICATIONS

Ali-Eldin A., et al., "SpotWeb: Running Latency-sensitive Distributed Web Services on Transient Cloud Servers," High-Performance Parallel and Distributed Computing, Jun. 17, 2019, pp. 1-12, XP058436391.

International Search Report and Written Opinion for International Application No. PCT/US2021/056059 dated Jan. 28, 2022, 16 pages.

* cited by examiner

Database 112

Prediction Time Periods

| Markets | 15 minutes | 1 hour | 3 hours | 6 hours | 12 hours | 24 hours |
|---|---|---|---|---|---|---|
| A (composite) | | | | | | |
| A (live) | | | | | | |
| A (deny) | | | | | | |
| B (composite) | | | | | | |
| B (live) | | | | | | |
| B (deny) | | | | | | |
| ... | ... | ... | ... | ... | ... | ... |
| N (composite) | | | | | | |
| N (live) | | | | | | |
| N (deny) | | | | | | |

302 — A (composite), A (live), A (deny)
304 — B (composite), B (live), B (deny)
306 — N (composite), N (live), N (deny)

INTERRUPTION PREDICTIONS FOR CLOUD COMPUTE INSTANCES

CROSS REFERENCE TO RELATED APPLICATIONS

This application claims priority to and the benefit of U.S. Provisional Patent Application No. 63/105,947, filed on Oct. 27, 2020, which is incorporated herein by reference in its entirety as if fully set forth below in its entirety and for all applicable purposes.

TECHNICAL FIELD

The present description relates to cloud infrastructure interruption predictions and rebalancing. More specifically, the present description relates to systems and methods for predicting interruptions to the use of spare cloud resources, such as cloud compute instances, and rebalancing based on those predictions.

BACKGROUND

Cloud computing involves the on-demand availability of cloud resources, such as storage and compute resources, to requesting users. Often, cloud providers may make these cloud resources available to requesting users at a price. Sometimes, cloud providers (e.g., public or private) have spare cloud resources left unused. To mitigate this, the cloud providers may offer the spare cloud resources to potential users at a discount from regular pricing. The cloud providers may do so while reserving an ability to "take back" some or all of the discounted resources with little warning, however.

When a cloud provider takes back a cloud resource, that can result in interruptions to the user that obtained use of the cloud resource at the offered discount. Users of these spare resources would therefore desire to know, in advance, when the cloud provider might take back a cloud resource. Problems arise, however, since users of these spare resources typically do not have access to data from the cloud providers that inform the users when they can expect spare resources to be taken back. More generally, problems arise with how to proactively predict for a user of the spare resources when the spare resources might be taken back.

BRIEF DESCRIPTION OF THE DRAWINGS

The present disclosure is best understood from the following detailed description when read with the accompanying figures.

DETAILED DESCRIPTION

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for predicting interruptions to the use of spare cloud resources, such as cloud compute instances, and rebalancing based on those predictions. For example, a computing platform may collect a large amount of data for a corresponding large number of customers over time. The data may include statistics related to interruptions of one or more spare cloud resources, such as spot instances (in some examples). This may include the interruption of live instances that have already launched and hosting one or more containers or web applications, etc., the denial of spot instances that have been bid on but denied launch, and/or usage information per market such as the number of instances alive (on-demand instances, spot instances, and/or reserved instances etc.).

With this large cache of historical data, the computing platform may according to embodiments of the present disclosure run one or more machine learning algorithms, such as a gradient boosting decision tree algorithm (as just one example) to generate a prediction classifier. The prediction classifier may relate to a given time window for prediction into the future, such as on the order of minutes or hours into the future. Moreover, different prediction classifiers may be generated based on the same machine learning algorithm or different algorithms. This may relate to different time windows for prediction into the future, such as 15 minutes into the future, 1 hour into the future, 3 hours into the future, 6 hours into the future, 12 hours into the future, and 24 hours into the future (as just some examples; other time frames, and more or fewer of them, may be used as well or instead).

With the prediction classifier(s) generated, the computing platform may monitor ongoing activity with one or more cloud providers on behalf of one or more customers/clients. This may include monitoring one or more resource metrics of the cloud provider, such as relating to the market and/or particular spot instances for a given customer. The computing platform may take this data as it is received, or within a time frame after receipt (such as every hour, or on demand from the client), and run the prediction classifier on it to generate a risk score. If there are multiple future time windows, and corresponding number of prediction classifiers, this may be done with each prediction classifier on the collected data. Or, it may be done on some subset thereof. Each risk score may identify an amount of risk that a spot instance related to that set of resource metrics data will be interrupted within the future time frame corresponding to that prediction classifier.

If the risk score exceeds a threshold, then it may be predicted (such as by the computing platform) that the interruption will occur within that time frame. If so, then the customer may be assisted in rebalancing to one or more other spot instances (or on-demand instances, or some combination thereof depending on the customer's price/risk profile). Further, if the predictions of interruptions start diverging from reality beyond some threshold (e.g., interruptions are not predicted that actually do occur, or too many interruptions are predicted that do not actually occur), then the computing platform may engage in retraining the prediction classifier. The computing platform may do so based on new data collected as part of its regular efforts, or may be done by launching test spot instances in markets that are currently not part of the dataset. A new spot instance may be launched as a test spot instance for a few minutes (such as on a per-hour purchase) and monitored to determine if an interruption occurs either while live, or denied launching to begin with. With this refreshed data, the prediction classifier (or multiple of them) may be retrained and applied as described above and further below.

As a result, embodiments of the present disclosure enable a customer to use spare cloud resources, such as spot instances, to reliably run an even broader range of applications on spot capacity, as it provides more accurate visibility into supply and demand, which drives better selection of long-living spare cloud resources and greater proactivity in avoiding interruptions. Moreover, this may result in rebalancing that may be performed in response to the prediction that a given spot instance(s) will be interrupted within a given time window in the future. For example, with the prediction based on a real-time analysis of workload requirements, rebalancing may be automatically triggered to automatically provision and allocate cloud infrastructure in the most efficient and effective way possible.

This may provide much earlier and more finely tuned predictions, and takes the customer's unique workload and application requirements into consideration when doing so. This may therefore ensure that each and every process has the time it needs to be completed without unnecessary interruption, all while at the lowest possible cost. In the event of a predicted interruption, each application that would be impacted may be transitioned to new, replacement instances (whether using other spare cloud resources such as other spot instances, or on-demand instances, or some other combination). This approach, which aligns predictions with application needs, may ensure uptime, scale, and successful workload execution for any situation. For example, this may provide predictions of interruptions from 15 minutes to an hour, or multiple hours ahead.

Figure 1:
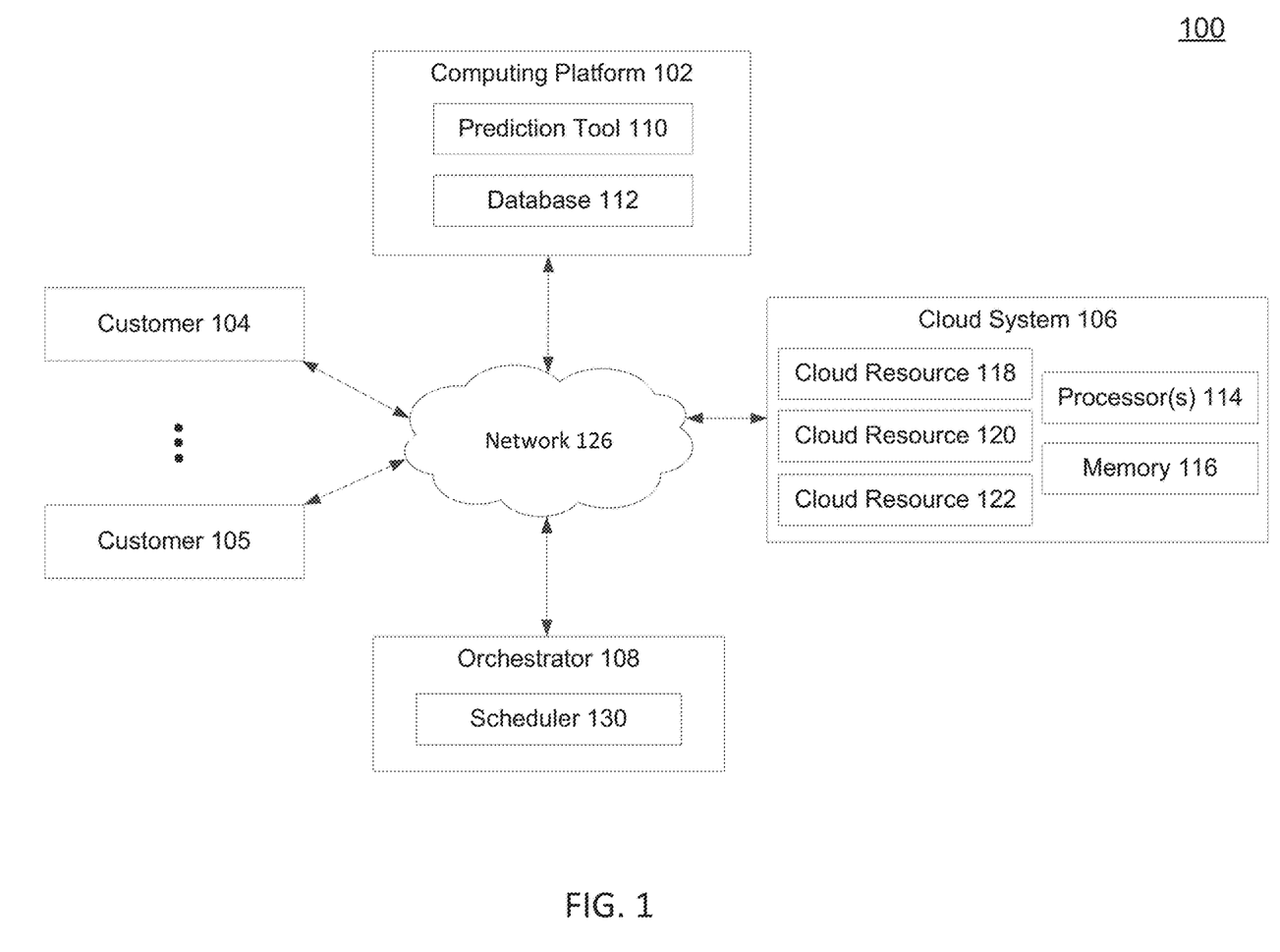
FIG. 1 illustrates a cloud provider environment according to some embodiments of the present disclosure.

FIG. 1 illustrates a cloud provider environment 100 according to some embodiments of the present disclosure. The cloud provider environment 100 may include, among other things, a computing platform 102, one or more customers 104, 105, a cloud system 106, and an orchestrator 108. These aspects of the cloud provider environment 100 may communicate with each other via a network 126. The network 126 may be, for example, the Internet, a local area network, a wide area network, and/or a wireless network (to name a few examples). The network 126 may include a variety of transmission media including cables, optical fibers, wireless routers, firewalls, switches, gateways, and/or other devices to facilitate communications between one or more of the aspects of the environment 100.

Cloud system 106 may be a provider of cloud infrastructure for one or more customers 104, 105. Cloud system 106 may provide a variety of cloud computing solutions, such as infrastructure as a service (IaaS), software as a service (SaaS), and/or platform as a service (PaaS) as some examples. For example, cloud system 106 may be a public cloud provider, examples of which include Amazon Web Services™ (AWS™) Microsoft® Azure®, and Google Cloud Platform™. These are by way of illustration. The cloud system 106 may represent a multi-tenant cloud provider that may host a variety of virtualization tools that customers 104, 105 may request to host or otherwise run one or more applications (e.g., via the network 126 and/or orchestrator 108). Alternatively, the cloud system 106 may represent a private cloud provider, such as an enterprise cloud for a given organization.

Cloud system 106, generally, may provide infrastructure including any set of resources used for executing one or more containers, virtual machines, or other hosted virtualization tool. Resources may include CPU resources, memory resources, caching resources, storage space resources, communication capacity resources, etc. that a virtualization tool such as a container may use for execution of one or more workloads for customers 104, 105. These resources are illustrated in FIG. 1 as cloud resources 118, 120, and 122 of cloud system 106. These may represent any number of cloud resources in any of a variety of combinations. As just one example, the cloud resources 118-122 may be in the form of one or more AWS EC2™ instances, or other instance type from a cloud provider.

Cloud system 106 may further include a processor 114, which may be one or more processors such as multiple processors. The processor 114 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 114 may also be implemented as a combination of computing devices, e.g., a combination of a DSP and a microprocessor, a plurality of microprocessors, one or more microprocessors in conjunction with a DSP core, or any other such configuration.

The processor 114 may be connected to memory 116 to execute one or more instructions stored in the memory 116 by the processor 114. The memory 116 may include a cache memory (e.g., a cache memory of the processor 114), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 116 includes a non-transitory computer-readable medium. The memory 114 may store, or have recorded thereon, instructions. The instructions may include instructions that, when executed by the processor 114, cause the processor 114 to perform the operations described herein with reference to providing infrastructure, such as for hosting one or more containers, in connection with aspects of the present disclosure. Instructions may also be referred to as machine executable code. The machine executable code may be for causing a device to perform these operations, for example by causing one or more processors to control or command the device to do so. The terms "instructions" and "code" should be interpreted broadly to include any type of computer-readable statement(s). For example, the terms "instructions" and "code" may refer to one or more programs, routines, subroutines, functions, procedures, etc. "Instructions" and "code" may include a single computer-readable statement or many computer-readable statements.

For example, a customer 104 (or 105, but referring to 104 for simplicity herein) may run one or more virtualization layers, such as virtual machines and/or containers on one or more cloud resources 118-122 of cloud system 106, via network 126. For example, a container may use a level of system level virtualization, such as by packaging up application code and its dependencies (e.g., system tools, system libraries and/or settings, etc.) so that the hosted application can be executed reliably on one or more computing platforms of the cloud system 106 (as an example). Some examples of software may include, for example, Red Hat® OpenShift®, Docker® containers, chroot, Linux®-VServer, FreeBSD® Jails, HP-UX® Containers (SRP), VMware ThinApp®, etc. Containers may run on the cloud system 106 on a host operating system directly, or may be run via another layer of virtualization (such as within a virtual machine).

Customers 104, 105 may orchestrate one or more containers using the cloud resources 118-122 using orchestrator 108. Orchestration may refer to scheduling containers within a predetermined set of available infrastructure represented by the cloud resources 118-122. The orchestrator 108 may be used to determine the required infrastructure based upon the needs of containers being executed/requested for execution. For example, orchestrator 108 may map each container to a different set of cloud resources 118-122, such as by selecting a set of containers to be deployed on each cloud resource 118-122 that is still available for use. Examples of orchestrator 108 may include Kubernetes®, Docker Swarm®, AWS Elastic Container Service™, etc. Generally, it may refer to a container orchestrator that is executed on a host system of cloud system 106, such as via processor(s) 114 and memory 116, etc., using a host operating system. The orchestrator 108 may further include a scheduler 130. Scheduler 130 may be used to make an actual request for infrastructure and allocation of containers to the infrastructure to the cloud system 106. An example of a scheduler 130 may include a Kubernetes® scheduler, which may execute on a host within network 126, either on the same hardware resources as orchestrator 108 or on other hardware and/or software resources.

The environment 100 may further include computing platform 102. The computing platform 102 may include a prediction tool 110 and a database 112. These may be executed by a processor or multiprocessor (such as one or more of the examples given above with respect to processor 114), memory (such as one or more of the examples given above with respect to memory 116, and which may include instructions which, when executed by the processor(s) of the computing platform 102, cause the processor to perform the operations described herein with respect to monitoring one or more metrics associated with cloud infrastructure such as that provided by cloud system 106, predicting cloud infrastructure interruptions, and/or rebalancing), and storage (not shown). While illustrated as part of computing platform 102, database 112 may alternatively be physically distinct from the rest of computing platform 102, and include its own processing and memory components to facilitate operation of the database.

According to embodiments of the present disclosure, computing platform 102 may assist in the collection of market data over time for one or more customers 104, 105 (etc.) as customers 104, 105 request and use cloud resources 118-122 (again, representing any number of resources). In some examples, one or more of customers 104, 105 may request a variety of cloud resources 118-122 at a variety of price points, depending on what is offered by cloud system 106 (as an example of one or more cloud providers) at any given point in time. For example, cloud system 106 as a cloud provider may offer different pricing options depending on demand. Some options may include reservations for future use (such as for a specified time period), which may be include discount as the customer 104 is paying for that reservation whether actually used or not. Another option may include an on-demand alternative, which may be more expensive because the customer 104 may request resources on-demand without committing to any long-term use beyond an incremental amount (e.g., for the next hour). This may result in customer 104 paying for on-demand resource(s) on an hour-by-hour (or other time interval) basis.

Generally, customers 104, 105 that purchase reserved or on-demand options may use those purchased resources for the specified time period (per the reservation, or per the time interval of the on-demand option) without interruption from the cloud system 106. Cloud system 106 may, at times, have excess resources that are not being consumed by the reserved or on-demand options noted above. This may represent a loss in potential revenue, so the cloud provider (via cloud system 106) may seek to reduce this underutilization by offering spare capacity at steep discounts to potential customers 104, 105. This spare capacity may be referred to herein also as a spare cloud resource in general, or more specifically as a spot instance, spare instance, etc. This may be offered via a bidding process or other mechanism(s) to customer 104, 105. For example, if using a bidding process, the customer 104 may provide a given maximum price per hour that the customer is willing to pay for a spare instance. If the spare capacity becomes available at or below that maximum price, the cloud system 106 may provision that capacity to the bidding customer for a period of time (such as an interval similar to that used for on-demand resources).

Depending on a variety of factors including how much spare capacity is available from a given cloud system 106 (more generally, from a cloud provider operating cloud system 106), as well as how much demand exists at that time for cloud resources, the going price for spare capacity may vary over time. Thus, the cloud system 106 might reserve the right to "interrupt" the customer 104's use of the spare capacity (e.g., by interrupting a so-called "spot instance" or "preemptible instance" as just some examples) even during a period for which the customer 104 paid for use—e.g., if use is paid on an hour-by-hour interval, a purchased spare instance might be interrupted during that hour. So, usage of spare capacity might be interruptible during use. As another example, spare capacity usage might be interruptible by the cloud provider denying use of requested spare capacity at the time of ordering it.

Such spare capacity, referred to herein as spot instances for ease of use and simplicity of discussion, may be much cheaper than on-demand and even reserved options. Therefore, they may be widely used by customers. Historically, this has been for predominantly stateless uses (e.g., situations where data does not need to transfer from one workload to another to maintain state) in view of the risk of interruption occurring. More recently, cloud providers have begun to offer warnings that interruptions are about to occur—but often the warnings provide very little notice, on the order of a few minutes (such as two minutes) or less.

According to embodiments of the present disclosure, therefore, the computing platform 102 may maintain a historical record of cloud capacity consumption (e.g., consumption of one or more of resources 118-122 of cloud system 106) over time, which may amount to billions of events collected by the computing platform 102. With this data, the prediction tool 110 may generate a prediction classifier (such as by using one or more machine learning and/or artificial intelligence algorithms). With the prediction classifier, the prediction tool 110 may be used to reliably predict which spot instances will be interrupted and which spot instances will enjoy greater longevity. The prediction tool 110 may do so for a variety of future time frames, for example providing predictions of interruptions 15 minutes into the future, 1 hour into the future, 3 hours into the future, 6 hours into the future, 12 hours into the future, and 24 hours into the future as just some examples. Other time frames may be possible instead of, or in addition to, those noted. With this information, interruptions may be accurately predicted up to an hour or several hours into the future, giving the customer 104 much more time to rebalance, etc.

The prediction classifier may be trained based on some window of historical data. For example, for a prediction 15 minutes into the future, the prediction tool 110 may train the classifier on a time window of 1 hour of past, collected data. As another example, for a prediction of 1 hour into the future, the prediction tool 110 may train the classifier on a time window of the last 24 hours. As yet another example, for a prediction of 24 hours into the future, the prediction tool 110 may train the classifier on a time window of the last week. In general, the data used to train a classifier may depend on the frequency of the prediction—for higher frequency (i.e., shorter time frames into the future) predictions, shorter past time windows may be used to train the classifier, and vice versa. In this way, the prediction can react more quickly.

Figure 2:
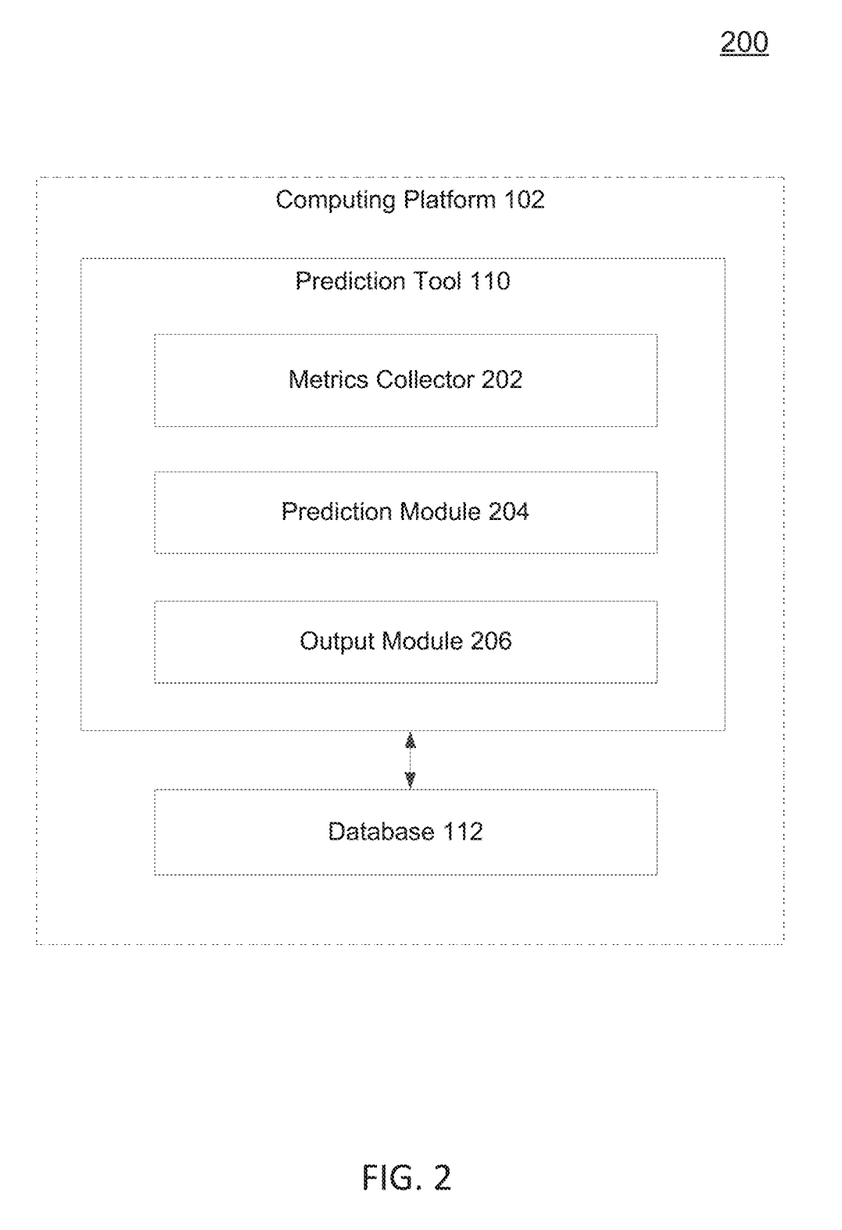
FIG. 2 illustrates a computing platform architecture according to some embodiments of the present disclosure.

Turning now to FIG. 2, more details of the computing platform 102 are illustrated according to embodiments of the present disclosure. As introduced in FIG. 1, the computing platform 102 may include the prediction tool 110 and the database 112. The database 112 may be part of the computing platform 102, or alternatively may be in communication with the computing platform 102 (e.g., part of a separate computing platform, etc.).

The prediction tool 110 may further include a metrics collector 202, a prediction module 204, and an output module 206. The metrics collector 202 may be used to collect a variety of metrics related to spot instances, including for example historical spot instance data including past interruptions (e.g., both interruptions while a spot instance is running a container, as well as when a spot instance is denied launch, such as to deploy a container for a bidding customer). The metrics collector 202 may also collect, as part of the historical data (e.g., part of the "billions of events" noted above), further information about spot instances that are interrupted including region/availability zone, instance type, size, and/or operating system (to name a few examples). These may be considered aspects of market data, where a "market" may refer to a spot instance market, and thus may also include current spot instance pricing. This historical data related to past interruptions may be stored in database 112 or some other database accessible by the computing platform 102.

The metrics collector 202 may further collect some or all of the same metrics noted above at the current, or near-current, time. This current data may be what the prediction classifier is run on to predict a future interruption. This data may be collected, for example, from cloud system 106, orchestrator 108, and/or customers 104, 105 (and/or other customers). The metrics collector 202 may provide the data it collects, e.g. by identifying where it is stored in a database, to the prediction module 204. While illustrated as part of prediction tool 110, the metrics collector 202 may alternatively be separate from the prediction tool 110 and communicate with prediction tool 110 aspects to facilitate predictions and/or rebalancing as discussed herein.

The prediction module 204 may be used to train the prediction classifier. For example, the prediction module 204 may implement one or more machine learning and/or artificial intelligence algorithms to train a prediction classifier based on historical interruption data. For example, the prediction module 204 may use a gradient-boosting algorithm that uses tree-based learning. An example of such a gradient boosting decision tree algorithm may be the LightGBM algorithm. Other examples of possible algorithms include deep learning algorithms, LDM (largest differencing method), regression-tree based algorithms, classification tree-based algorithms, k-nearest neighbors, Bayesian algorithms, random forest, and/or artificial neural networks (e.g., feed-forward, convolutional, recurrent, etc.).

The prediction module 204 may also be used to apply the trained prediction classifier on current (or near-current) market data, to then generate the prediction of whether a future interruption will occur. For example, the prediction module 204 may, in some embodiments, generate a different prediction classifier for each respective window of future time. That is, for a 15 minute window into the future (e.g., trained on an hour (as an example) of past data), one prediction classifier may be generated, and for an hour window into the future (e.g., trained on 24 hours of past data), another prediction classifier may be generated, and so on with the respective other prediction classifiers for any other windows of time of interest for predictions. As an alternative, a composite single prediction classifier may be generated and used that composites the respective time windows of interest, and used for classifying current (or near-current) data. Embodiments will be discussed herein with respect to a prediction classifier generated for a specific window of time for simplicity of discussion.

For example, the prediction classifier for a given time window may be run on current market data, and the result of the classifier output to the database 112 via the output module 206. The output module 206 may include software and/or hardware to facilitate the transfer of data from the active memory/processor of the computing platform 102 to the longer-term storage of the database 112 and/or other location(s) for the prediction value. In some examples, the result of the classifier being run on the current market data (or some subset thereof) may be in the form of a risk score, such as a decimal value, a percentage value, etc. For example, the risk score may assume a value between 0 and 1, with values towards 0 indicating less likelihood of an interruption occurring, and values towards 1 indicating more likelihood of an interruption occurring.

The prediction of whether an interruption will occur within the future time frame of interest (e.g., within the next hour or several hours) may be made upon comparing the risk score (or, more generally, the output of the prediction module 204) to a risk threshold. For example, where the risk score is expressed in decimals, a threshold of 0.9 (as just one numerical example) may be used, such that if the risk score is above the threshold, the confidence is higher that an interruption will occur. The higher the threshold, the fewer false positives that might occur, while the lower the threshold, the more false positives that might occur. In some examples, false positives might be somewhat acceptable where the market(s) in which replacement spot instances may be found are relatively cheap. In some examples, the threshold may be dynamic—it may be changed in response to user request and/or automatic feedback/analysis of how many false positives are occurring within a given window of time. Thus, the threshold may be used to adaptively control how responsive the prediction tool 110 is to changing circumstances and/or a false positive rate.

Figure 3:
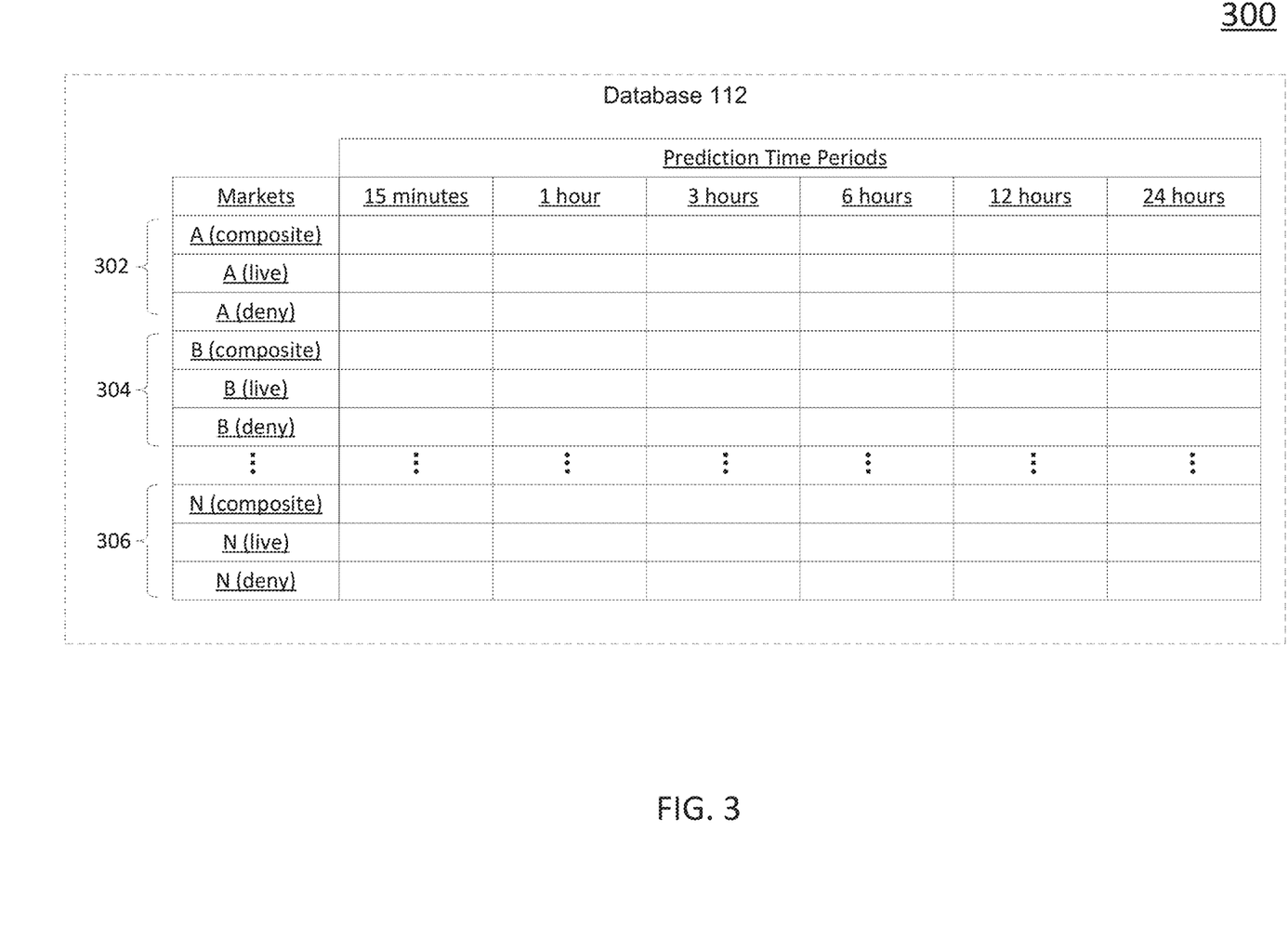
FIG. 3 illustrates an exemplary database in cooperation with the computing platform architecture according to some embodiments of the present disclosure.

An example of a database 112 operating in cooperation with the computing platform 102 is illustrated in FIG. 3. The configuration of the database environment 300 illustrated in FIG. 3 is for illustrative purposes only; other configurations for the database 112 may be used instead according to aspects of the present disclosure.

As illustrated, the database 112 may include fields in which to enter future predictions for varying time intervals into the future. In the illustrated example, this includes 15 minutes into the future, 1 hour into the future, 3 hours into the future, 6 hours into the future, 12 hours into the future, and 24 hours into the future. Other time windows, and more or fewer, may be used instead. Further, this information may be generated and stored related to multiple different markets. For example, illustrated are for markets A, B, and N, where N illustrates the concept of N-number of markets (indicating that any number of markets may be analyzed and tracked by the database 112).

Market A may include multiple entries 302 covering different risk scores. For example, entries 302 may include a first risk score for a given future time window (e.g., 1 hour into the future), related to a risk of an interruption occurring to a spot instance that is already live (illustrated as "A (live)" in FIG. 3). As another example, entries 302 may include a second risk score for the given future time window, related to a risk of a spot instance request being denied launch to begin with (illustrated as "A (deny)" in FIG. 3.). As yet another example, entries 302 may also include a third risk score that is a composite (e.g., an average, a weighted average, etc.) of the first two risk scores. Such values may be generated for each future time window for the entries 302. Entries for other markets, such as entries 304 for market B and entries 306 for market N may similarly be generated. Some or all of these risk scores for a given future time window of interest may be used to predict whether an interruption will occur within that time frame (e.g., by comparing against the threshold, etc.).

In further embodiments, the database 112 may also include usage information for each market. For example, the usage information may include the number of instances alive including reserved, on-demand, and spot instances. This may be aggregated per customer, in some examples. Further, information may be collected on all instances that are interrupted, whether while live or denied launch, per market as well as per customer, or some combination thereof. As yet another example, spot instances may be tracked in aggregate, regardless of interruption type, while in other examples the types of interruptions can be tracked as well (e.g., stopping, hibernating, and/or terminating the instance), and/or reasons for interruption (e.g., price, capacity, client-specified constraint, etc.). This may be specified by the customer (which types to monitor/delineate in the data), and used to predict interruptions in the future.

Returning again to FIG. 2, the prediction module 204 may further be used to compare the generated risk score(s) to one or more thresholds to make the prediction of whether an interruption will occur within the target time frame. This may be done under the direction of customer 104 (as one example) via network 126. As another example, customer 104 may send a request to orchestrator 108, which may pass on the request (either unmodified, or modified with additional and/or different information in one or more packets) to the computing platform 102. The prediction may be returned to the customer and/or to some other application or system. The returned information may be used to request alternative spot instances that are predicted to stay uninterrupted for the time frame of interest (e.g., for the next hour or 3 hours). Alternatively, the risk scores may be the values accessed by the application and used to make the prediction of interruption upon comparison to the threshold.

In some examples, the risk scores may be generated on a periodic basis, such as on a period which is of interest to customers. This may be determined on a per-customer basis, or may be applied across customers. For example, the risk scores may be generated every hour, either for one risk score future window (such as an hour window), or updated every hour for every time window (15 minutes, 1 hour, etc.), or some subset thereof. In other examples, the risk scores may be updated on demand when a client requests it (such as customer 104). As yet another example, the risk scores may be updated either on demand, or at some minimum periodic basis. Thus, if a customer has not requested an update within a time period, such as every day, half day, or number of hours, etc., then the prediction tool 110 may run its prediction classifier(s) to update one or more of the risk scores (which updates may be stored as new data, not overwriting old risk scores, while in other examples the risk scores are replaced when new scores are generated).

In some embodiments, situations may arise where it may be worthwhile to update the prediction classifier for one or more of the future time window categories. For example, the prediction tool 110 (e.g., via metrics collector 202 and/or prediction module 204) may be further configured to track the number of interruptions within a given time window. If there are proportionally more interruptions than expected given a threshold level set for the determination of interruptions, such as more interruptions than a threshold set in view of the threshold level for the initial determination, then this may trigger the prediction tool 110 to start a retraining on the prediction classifier(s). For example, the retraining may be triggered on a per-classifier (e.g., per time window basis), or on an overall basis. This may correspond to a scenario where the predictions of interruptions are off from reality, such as by more than 10% (as just one non-limiting example).

In order to retrain, in some embodiments, the retraining may be done on updated data collected from the markets already being monitored, such as the market(s) in which spot instances have been launched, requested, bid on, etc. In other embodiments, the prediction tool 110 may seek out fresh data on which to train, such as via the metrics collector 202. For example, the prediction tool 110 may launch test spot instances in markets that are currently not part of the dataset. Such situations may arise where some markets have been "banned" (not included in a list of options for a customer in view of not meeting one or more customer requirements for service level agreements etc.) by the computing platform 102, for example based on risk scores for those markets being too high, too often (too many interruptions for meet an SLA, etc.). A new spot instance may be launched as a test spot instance for a few minutes (such as on a per-hour purchase) and monitored to determine if an interruption occurs either while live, or denied launching to begin with.

With these risk scores, rebalancing may be performed in response to the prediction that a given spot instance(s) will be interrupted within a given time window in the future. For example, with the prediction based on a real-time analysis of workload requirements, rebalancing may be automatically triggered to automatically provision and allocate cloud infrastructure, such as provided by cloud system 106, in the most efficient and effective way possible. This may provide much earlier and more finely tuned predictions, and takes the customer's unique workload and application requirements into consideration when doing so. This may therefore ensure that each and every process has the time it needs to be completed without unnecessary interruption, all while at the lowest possible cost. In the event of a predicted interruption, each application that would be impacted may be transitioned to new, replacement instances (whether using other spare cloud resources such as other spot instances, or on-demand instances, or some other combination). This approach, which aligns predictions with application needs, may ensure uptime, scale, and successful workload execution for any situation. Further, interruptions may be accurately predicted up to an hour or several hours into the future, giving the customer much more time to rebalance or otherwise act on the information.

Figure 4:
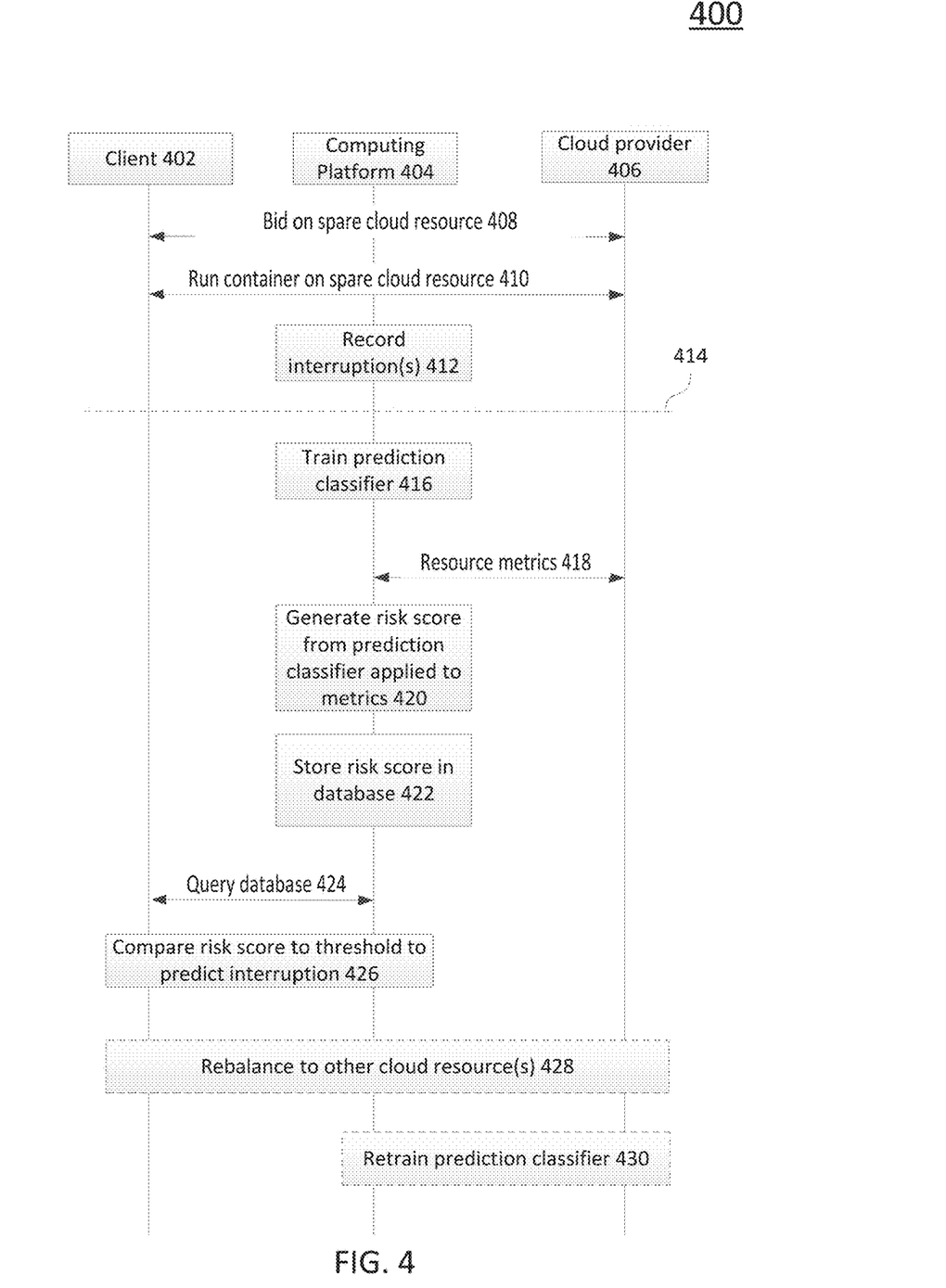
FIG. 4 illustrates an exemplary process flow for cloud infrastructure interruption predictions and rebalancing according to some embodiments of the present disclosure.

Turning now to FIG. 4, an exemplary process flow 400 for cloud infrastructure interruption predictions and rebalancing according to some embodiments of the present disclosure is illustrated. FIG. 4 illustrates the flow 400 between different elements including a client 402, a computing platform 404, and a cloud provider 406. Client 402 may be an example of the clients, customers, and/or consumers described above with respect to FIG. 1 and FIG. 2, such as customers 104 or 105. Computing platform 404 may be an example of computing platform 102. Cloud provider 406 may be an example of a cloud provider operating cloud system 106 illustrated in FIG. 1.

At action 408, the client 402 may bid on spare cloud resource(s). As discussed above, when a cloud provider 406 has unused capacity (e.g., excess resources that are not being consumed by reserved or on-demand options, or other purchased on-demand instances), the cloud provider 406 may seek to reduce this underutilization by offering spare capacity at steep discounts to potential customers 104, 105. This offering of spare capacity, and the client 402's request to use it (of which bidding to do so is a non-limiting example), is what is illustrated at action 408.

At action 410, the client 402 may run a container (or other system virtualization) on a spare cloud resource (e.g., one of cloud resources 118-122, such as spot instance(s)) that was obtained via the process at action 408. This may include the client 402 seeking to launch the container on the instance, or if successful the running of the container on the obtained instance.

At action 412, the computing platform 404, which may have been monitoring the interactions between the client 402 and the cloud provider 406 such as via an orchestrator (e.g., orchestrator 108 in FIG. 1), may record any interruptions that may occur during actions 408 and/or 410. For example, these interruptions may be in the form of denials of running containers on obtained spot instances, or in the form of interruptions while the container is live on an obtained spot instance.

Actions 408-412 may relate to a pre-training period. After sufficient time has passed, illustrated as boundary 414 in FIG. 4, the system may be in a condition where it is allowed and/or instructed to train one or more prediction classifiers for use in predicting future interruptions. As noted previously, a sufficient amount of data to train a classifier may have a relationship such as 1 hour's worth of past data for a 15-minute into the future prediction, or 24 hours' worth of past data for a 1-hour into the future prediction, and so forth. It is worth noting that actions 408-412 may occur before predictions occur according to embodiments of the present disclosure, or may occur during operation of predictions.

At action 416, with sufficient data for generating at least one prediction classifier, the computing platform 404 (such as using the prediction tool 110) may train one or more prediction classifiers using an algorithm, such as a machine learning (e.g., an efficient gradient boosting decision tree or other ML or AI algorithm). This may include a separate prediction classifier for each respective window of future time of interest (e.g., a separate classifier for 15-minute predictions, another for 1-hour predictions, and so forth).

At action 418, the computing platform 404 may monitor or otherwise receive one or more resource metrics from the cloud provider 418. For example, the computing platform 404 may monitor interactions between the client 402 and the cloud provider 406, and/or between an orchestrator for the client 402 and the cloud provider 406, including market information containing resource metrics of interest to the algorithm. In other examples, the computing platform 404 may periodically poll the cloud provider 406 for one or more of these metrics.

At action 420, the computing platform 404 may generate one or more risk scores from corresponding one or more prediction classifiers. For example, the computing platform 404 may apply the prediction classifier for a future time window to some subset, or all, of the resource metrics collected at action 418 (which may correspond to current metrics, e.g. real-time data, or recently acquired data from some short time in the past). This may be repeated with as many prediction classifiers as exist with the computing platform 404 for the given client 402, or for some subset of prediction classifiers (corresponding to respective future time periods that are different in magnitude from each other).

At action 422, the generated risk score(s) from action 420 may be stored in a database, such as database 112 (FIG. 1).

At action 424, the client 402 may query the database 112 for one or more of the risk scores. Alternatively, action 424 may occur by another application operated by the computing platform 404, or by orchestrator 108, or some other computing node operating under client 402's request.

At action 426, the risk score(s) obtained via the query at action 424 may be used to compare against a threshold. This may be done to predict whether an interruption will happen during a given time frame in the future. This may be done by the computing platform 404, the client 402, orchestrator 108, or other node under the client 402's direction.

At action 428, the client 402's spot instance (such as a containerized workload and/or a web application, etc.) may be rebalanced to other cloud resource(s), such as other spare cloud resources (e.g., spot instances), on-demand resources, and/or reserved resources. This may be done in a manner that aligns with the client 402's SLA to keep applications running without unacceptable interruptions. This rebalancing may be performed by the computing platform 404, client 402, and/or other node(s) at client 402's direction. This may be done in response to a determination at action 426 that an interruption is predicted within the given future time frame. This is illustrated as optional, illustrating the dependence on the outcome of action 426.

At action 430, the computing platform 404 may initiate a retraining procedure for one or more of the prediction classifiers. This may be done in response to a triggering factor, such as in response to a tracked number of interruptions within a given time window exceeding some acceptable range (such as more interruptions than a threshold set in view of the threshold level for the initial determination). The retraining may be on a per-classifier basis (e.g., per time window basis), or on an overall basis.

Retraining may include running the algorithm which may be done on updated data collected from the markets already being monitored, such as the market(s) in which spot instances have been launched, requested, bid on, etc. Or it may include running the algorithm on fresh data on which to train, such as by launching test instances in one or more sample markets as discussed above. As another example, the retraining may be done by the same algorithm or by selecting a different algorithm and comparing the results, or by using a composite of two or more algorithms. Action 430 is also illustrated as optional, depending upon client 402 preference and/or whether retraining is triggered based on one or more factors.

Figure 5:
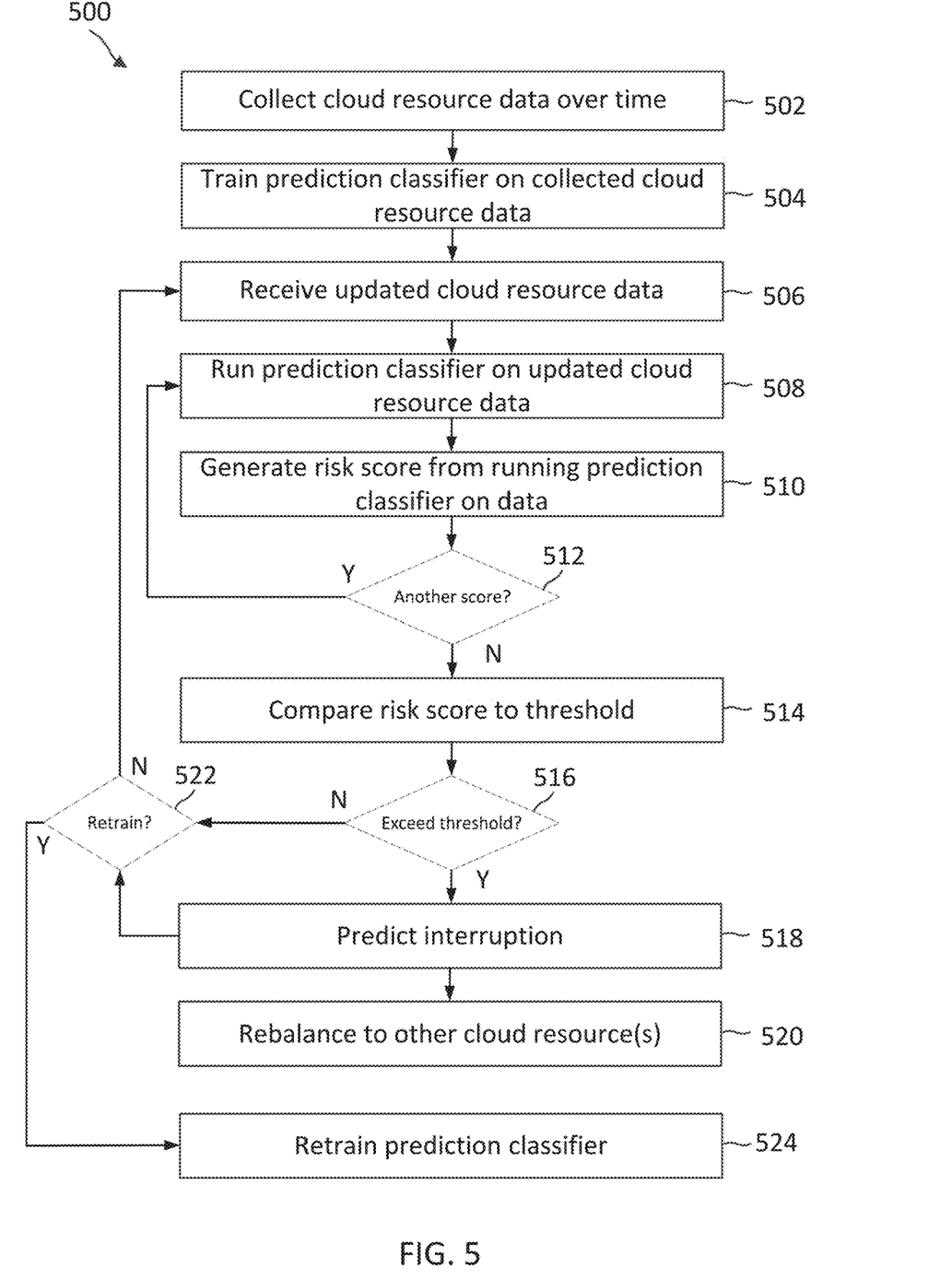
FIG. 5 illustrates a method for cloud infrastructure interruption predictions and rebalancing according to some embodiments of the present disclosure.

Turning to FIG. 5, a flow diagram of an exemplary method 500 for cloud infrastructure interruption predictions and rebalancing is illustrated according to embodiments of the present disclosure. In the description of FIG. 5, reference is made to the elements of FIGS. 1 and 2 for simplicity of illustration. In an embodiment, the method 500 may be implemented by an exemplary computing platform 102/404. It is understood that additional steps can be provided before, during, and after the steps of method 500, and that some of the steps described can be replaced or eliminated for other embodiments of the method 500.

At block 502, the computing platform 102 may collect cloud resource data over time, for example via metrics collector 202 of prediction tool 110. This may be an example of action 412 from FIG. 4 above, corresponding to the computing platform 102 monitoring interactions between a customer 104, 105 and the cloud system 106, such as any interruptions that may occur. For example, these interruptions may be in the form of denials of running containers on obtained spot instances, or in the form of interruptions while the container is live on an obtained spot instance.

At block 504, the computing platform 102 may train a prediction classifier on the cloud resource data collected over time from block 502. This may be done, for example, by the prediction module 204 of FIG. 2. Moreover, as noted elsewhere this may include multiple prediction classifiers corresponding to multiple future time windows, based on varying amounts of past data (e.g., larger amounts of past data for larger future time windows).

At block 506, the computing platform 102 may receive updated cloud resource data, such as current market resource metrics, about spare cloud resources of interest (such as one or more spot instances that the customer 104 "won" and purchased use of for a given window such as an hour, unless interrupted).

At block 508, the computing platform 102 may run the prediction classifier generated at block 504 on the updated cloud resource data received at block 506. The prediction module 204 of prediction tool 110 may perform this. This may include one prediction classifier run on the data to predict the risk score for an interruption occurring a time window into the future for which the specific prediction classifier was generated. Or, it may include multiple prediction classifiers run in series or in parallel on the data to predict multiple corresponding risk scores for varying future time windows.

At block 510, the computing platform 102 may generate a risk score from the prediction classifier run on the updated cloud resource data at block 508. This may be generated by the prediction module 204, for example. In some examples, this may be done for one or a subset of future time windows, or may be done for all future time windows with corresponding specific prediction classifiers. The risk scores may be stored in a database, such as database 112, for example via output module 206 of FIG. 2.

For example, if there are multiple risk scores for corresponding multiple prediction classifiers, then at decision block 512 the method 500 may return to block 508 and proceed as discussed above and further below. If, instead, the last risk score has been generated at block 510, then the method 500 proceeds from decision block 512 to block 514.

At block 514, the computing platform 102 may compare the risk score(s) generated from action 510 to a threshold to determine whether to predict an interruption. For example, a different risk score for each respective future time window may be compared to a different threshold. As just one example, a risk score corresponding to a 1-hour future window may have a different threshold to compare against than a 6-hour future time window. Or, the thresholds may be the same. They may be set by customer 104, for example. While described as occurring with computing platform 102 (e.g., by prediction tool 110, such as prediction module 204), the comparison to a threshold may alternatively be performed by another computing system, such as with customer 104 or orchestrator 108, or some other node as requested by the customer 104. This may be repeated (or done in parallel) for each risk score generated, and may include a comparison of the live risk score, the denial risk score, and/or the composite risk score to one or more thresholds.

At decision block 516, if the risk score exceeds the threshold compared against at block 514, then the method 500 may proceed to block 518. This may relate to one of all the risk scores compared exceeding a corresponding threshold, or may relate to some subset of the risk scores exceeding their respective thresholds, or relate to all of the risk scores exceeding their respective thresholds.

At block 518, the computing platform 102 may predict an interruption within the future time frame corresponding to the risk score that exceeded its respective threshold (or for the subset of risk scores, or all risk scores, etc.). Alternatively, while described as occurring with computing platform 102 (e.g., by prediction tool 110, such as prediction module 204), the comparison to a threshold may alternatively be performed by another computing system, such as with customer 104 or orchestrator 108, or some other node as requested by the customer 104. This prediction may be output to the customer 104 for action, or to another tool used by customer 104, or output to the prediction tool 110 for further action.

At block 520, for example, the computing platform 102 may perform a rebalancing from the current spare cloud resource(s) to other cloud resources, such as other spare cloud resources and/or on-demand cloud resources, such as spot instances and/or on-demand instances. Alternatively, rebalancing may be done by one or more other nodes, such as orchestrator 108 or some other node requested by the customer 104.

Returning to decision block 516, if the risk score (or some subset of risk scores) does not exceed the respective threshold (or thresholds, when multiple scores), then the method 500 may proceed instead to decision block 522.

At decision block 522, if it is determined to retrain the prediction classifier (or some subset of classifiers, or all classifiers), then the method will proceed to block 524. This may correspond to an appropriate trigger occurring, such as discussed with respect to some embodiments above. For example, this may be done in response to a triggering factor, such as in response to a tracked number of interruptions within a given time window exceeding some acceptable range (such as more interruptions than a threshold set in view of the threshold level for the initial determination).

At block 524, the computing platform 102 may initiate a retraining procedure for one or more of the prediction classifiers. The retraining may be on a per-classifier basis (e.g., per time window basis), or on an overall basis. Retraining may include running the algorithm which may be done on updated data collected from the markets already being monitored, such as the market(s) in which spot instances have been launched, requested, bid on, etc. Or it may include running the algorithm on fresh data on which to train, such as by launching test instances in one or more sample markets as discussed above. As another example, the retraining may be done by the same algorithm or by selecting a different algorithm and comparing the results, or by using a composite of two or more algorithms.

Returning to decision block 522, if retraining is not triggered, then the method 500 may return to block 506 and proceed as described above when more updated cloud resource data is received (e.g., which may be received periodically such as every hour, or when requested by customer 104 to obtain, etc.).

Figure 6:
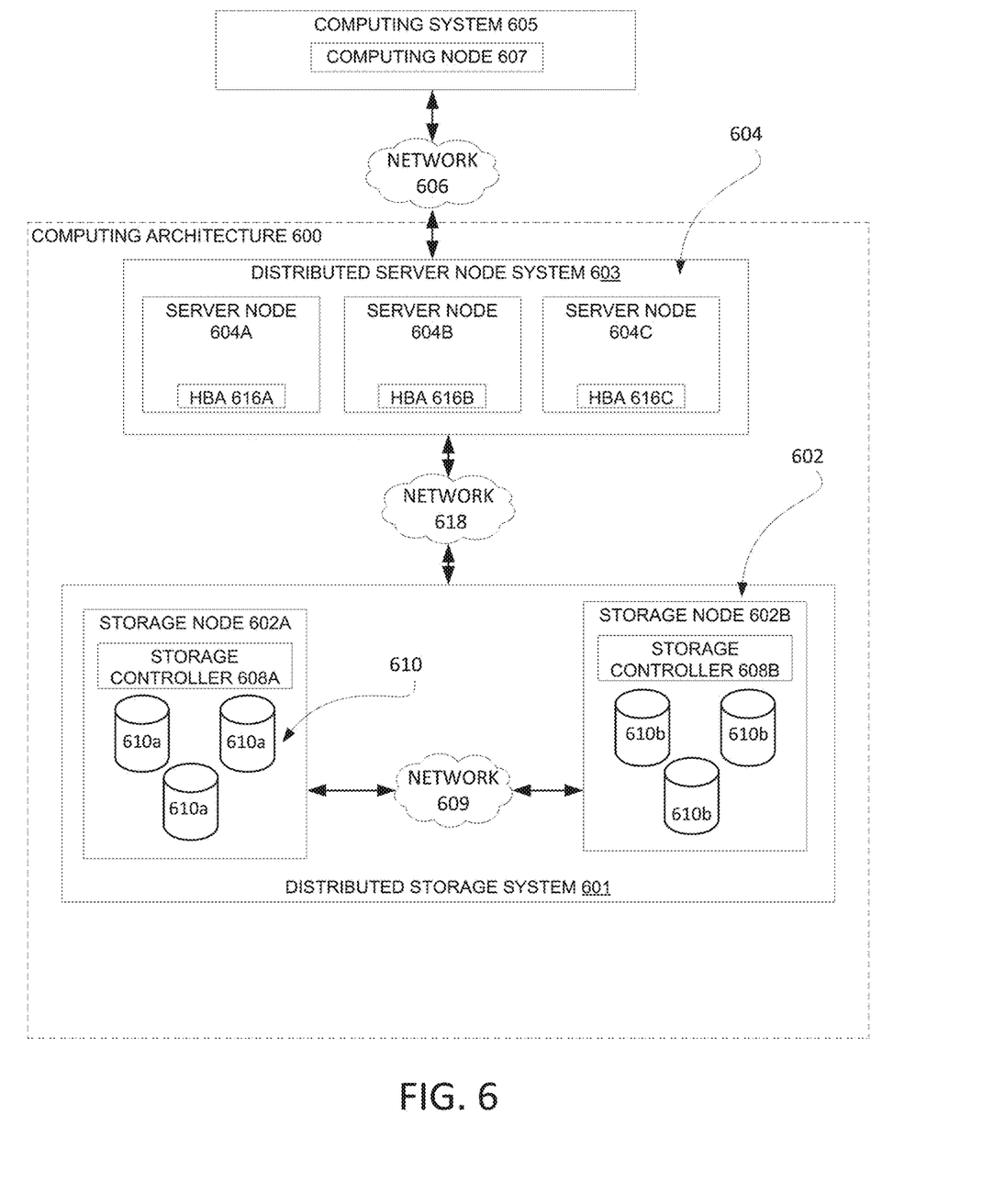
FIG. 6 is an illustration of an exemplary computing architecture according to some embodiments of the present description.

FIG. 6 is an illustration of a computing architecture 600 in accordance with one or more example embodiments. The computing architecture 600 is an example of one manner in which one or more of the computing architectures described herein may be implemented. The computing architecture 600, which, in some cases includes a distributed storage system 601 comprising a number of storage nodes 602 (e.g., storage node 602a, storage node 602b) in communication with a distributed server node system 603 comprising a number of server nodes 604 (e.g., server node 604a, server node 604b, server node 604c). The distributed storage system 601 and the distributed server node system 603 are examples in which containers and controllers of the above figures may be implemented, for example.

A computing system 605 communicates with the computing architecture 600, and in particular, the distributed server node system 603, via a network 606. The network 606 may include any number of wired communications links, wireless communications links, optical communications links, or combination thereof. In one or more examples, the network 606 includes at least one of a Local Area Network (LAN), an Ethernet subnet, a PCI or PCIe subnet, a switched PCIe subnet, a Wide Area Network (WAN), a Metropolitan Area Network (MAN), the Internet, or some other type of network.

The computing system 605 may include, for example, at least one computing node 607. The computing node 607 may be implemented using hardware, software, firmware, or a combination thereof. In one or more other examples, the computing node 607 is a client (or client service) and the computing system 605 that the client runs on is, for example, a physical server, a workstation, etc.

The storage nodes 602 may be coupled via a network 609, which may include any number of wired communications links, wireless communications links, optical communications links, or a combination thereof. For example, the network 609 may include any number of wired or wireless networks such as a LAN, an Ethernet subnet, a PCI or PCIe subnet, a switched PCIe subnet, a WAN, a MAN, a storage area network (SAN), the Internet, or the like. In some embodiments, the network 609 may use a transmission control protocol/Internet protocol (TCP/IP), a remote direct memory access (RDMA) protocol (e.g., Infiniband®, RDMA over Converged Ethernet (RoCE) protocol (e.g., RoCEv1, RoCEv2), iWARP), and/or another type of protocol. Network 609 may be local or remote with respect to a rack or datacenter. Additionally, or in the alternative, the network 609 may extend between sites in a WAN configuration or be a virtual network extending throughout a cloud. Thus, the storage nodes 602 may be as physically close or widely dispersed as needed depending on the application of use. In some examples, the storage nodes 602 are housed in the same racks. In other examples, the storage nodes 602 are located in different facilities at different sites around the world. The distribution and arrangement of the storage nodes 602 may be determined based on cost, fault tolerance, network infrastructure, geography of the server nodes 604, another consideration, or a combination thereof.

The distributed storage system 601 processes data transactions on behalf of other computing systems such as, for example, the one or more server nodes 604. The distributed storage system 601 may receive data transactions from one or more of the server nodes 604 and take an action such as reading, writing, or otherwise accessing the requested data. These data transactions may include server node read requests to read data from the distributed storage system 601 and/or server node write requests to write data to the distributed storage system 601. For example, in response to a request from one of the server nodes 604a, 604b, or 604c, one or more of the storage nodes 602 of the distributed storage system 601 may return requested data, a status indictor, some other type of requested information, or a combination thereof, to the requesting server node. While two storage nodes 602a and 602b and three server nodes 604a, 604b, and 604c are shown in FIG. 6, it is understood that any number of server nodes 604 may be in communication with any number of storage nodes 602. A request received from a server node, such as one of the server nodes 604a, 604b, or 604c may originate from, for example, the computing node 607 (e.g., a client service implemented within the computing node 607) or may be generated in response to a request received from the computing node 607 (e.g., a client service implemented within the computing node 607).

While each of the server nodes 604 and each of the storage nodes 602 is referred to as a singular entity, a server node (e.g., server node 604a, server node 604b, or server node 604c) or a storage node (e.g., storage node 602a, or storage node 602b) may be implemented on any number of computing devices ranging from a single computing system to a cluster of computing systems in communication with each other. In one or more examples, one or more of the server nodes 604 may be run on a single computing system, which includes at least one processor such as a microcontroller or a central processing unit (CPU) operable to perform various computing instructions that are stored in at least one memory. In one or more examples, at least one of the server nodes 604 and at least one of the storage nodes 602 reads and executes computer readable code to perform the methods described further herein to orchestrate parallel file systems. The instructions may, when executed by one or more processors, cause the one or more processors to perform various operations described herein in connection with examples of the present disclosure. Instructions may also be referred to as code, as noted above.

A processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD- ROM, DVD, BD); a video controller such as a graphics processing unit (GPU); at least one network interface such as an Ethernet interface, a wireless interface (e.g., IEEE 802.11 or other suitable standard), a SAN interface, a Fibre Channel interface, an Infiniband® interface, or any other suitable wired or wireless communication interface; and/or a user I/O interface coupled to one or more user I/O devices such as a keyboard, mouse, pointing device, or touchscreen.

In one or more examples, each of the storage nodes 602 contains any number of storage devices 610 for storing data and can respond to data transactions by the one or more server nodes 604 so that the storage devices 610 appear to be directly connected (i.e., local) to the server nodes 604. For example, the storage node 602a may include one or more storage devices 610a and the storage node 602b may include one or more storage devices 610b. In various examples, the storage devices 610 include HDDs, SSDs, and/or any other suitable volatile or non-volatile data storage medium. In some examples, the storage devices 610 are relatively homogeneous (e.g., having the same manufacturer, model, configuration, or a combination thereof). However, in other example, one or both of the storage node 602a and the storage node 602b may alternatively include a heterogeneous set of storage devices 610a or a heterogeneous set of storage device 610b, respectively, that includes storage devices of different media types from different manufacturers with notably different performance.

The storage devices 610 in each of the storage nodes 802 are in communication with one or more storage controllers 608. In one or more examples, the storage devices 610a of the storage node 602a are in communication with the storage controller 608a, while the storage devices 610b of the storage node 602b are in communication with the storage controller 608b. While a single storage controller (e.g., 608a, 608b) is shown inside each of the storage node 602a and 602b, respectively, it is understood that one or more storage controllers may be present within each of the storage nodes 602a and 602b.

The storage controllers 608 exercise low-level control over the storage devices 610 in order to perform data transactions on behalf of the server nodes 604, and in so doing, may group the storage devices 610 for speed and/or redundancy using a protocol such as RAID (Redundant Array of Independent/Inexpensive Disks). The grouping protocol may also provide virtualization of the grouped storage devices 610. At a high level, virtualization includes mapping physical addresses of the storage devices 610 into a virtual address space and presenting the virtual address space to the server nodes 604, other storage nodes 602, and other requestors. Accordingly, each of the storage nodes 602 may represent a group of storage devices as a volume. A requestor can therefore access data within a volume without concern for how it is distributed among the underlying storage devices 610.

The distributed storage system 601 may group the storage devices 610 for speed and/or redundancy using a virtualization technique such as RAID or disk pooling (that may utilize a RAID level). The storage controllers 608a and 608b are illustrative only; more or fewer may be used in various examples. In some cases, the distributed storage system 601 may also be communicatively coupled to a user display for displaying diagnostic information, application output, and/ or other suitable data.

With respect to the distributed server node system 603, each of the one or more server nodes 604 includes any computing resource that is operable to communicate with the distributed storage system 601, such as by providing server node read requests and server node write requests to the distributed storage system 601. In one or more examples, each of the server nodes 604 is a physical server. In one or more examples, each of the server nodes 604 includes one or more host bus adapters (HBA) 616 in communication with the distributed storage system 601. The HBA 616 may provide, for example, an interface for communicating with the storage controllers 608 of the distributed storage system 601, and in that regard, may conform to any suitable hardware and/or software protocol. In various examples, the HBAs 616 include Serial Attached SCSI (SAS), iSCSI, InfiniBand®, Fibre Channel, and/or Fibre Channel over Ethernet (FCoE) bus adapters. Other suitable protocols include SATA, eSATA, PATA, USB, and FireWire.

The HBAs 616 of the server nodes 604 may be coupled to the distributed storage system 601 by a network 618 comprising any number of wired communications links, wireless communications links, optical communications links, or combination thereof. For example, the network 618 may include a direct connection (e.g., a single wire or other point-to-point connection), a networked connection, or any combination thereof. Examples of suitable network architectures for the network 618 include a LAN, an Ethernet subnet, a PCI or PCIe subnet, a switched PCIe subnet, a WAN, a MAN, the Internet, Fibre Channel, or the like. In many examples, a server node 604 may have multiple communications links with a single distributed storage system 601 for redundancy. The multiple links may be provided by a single HBA 616 or multiple HBAs 616 within the server nodes 604. In some examples, the multiple links operate in parallel to increase bandwidth.

In one or more examples, each of the server nodes 604 may have another HBA that is used for communication with the computing system 605 over the network 606. In other examples, each of the server nodes 604 may have some other type of adapter or interface for communication with the computing system 605 over the network 606.

To interact with (e.g., write, read, modify, etc.) remote data, a HBA 616 sends one or more data transactions to the distributed storage system 601. Data transactions are requests to write, read, or otherwise access data stored within a volume in the distributed storage system 601, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The distributed storage system 601 executes the data transactions on behalf of the server nodes 604 by writing, reading, or otherwise accessing data on the relevant storage devices 610. A distributed storage system 601 may also execute data transactions based on applications running on the distributed server node system 603. For some data transactions, the distributed storage system 601 formulates a response that may include requested data, status indicators, error messages, and/or other suitable data and provides the response to the provider of the transaction.

In one or more examples, an orchestration system may be a container orchestration system that enables file system services to be run in containers and volumes to be mounted from the distributed storage system 601 to the distributed server node system 603, in particular according to embodiments of the present disclosure.

The foregoing outlines features of several examples so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the examples introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
applying, by a computing system, a prediction classifier on spare cloud resource data associated with a spare cloud resource on which a container is scheduled for execution;
outputting, by the computing system from the applying of the prediction classifier, a risk score indicating a likelihood of an interruption occurring for the spare cloud resource within a future time period, wherein the risk score comprises a live interruption risk score component corresponding to a first risk of the container on the spare cloud resource being interrupted and a denied scheduling risk score component corresponding to a second risk of the container being denied to launch on the spare cloud resource; and
rebalancing, by the computing system, the container from the spare cloud resource to another cloud resource based on the risk score.

2. The method of claim 1, further comprising:
storing, by the computing system, the risk score in a database.

3. The method of claim 1, wherein the risk score comprises a composite risk score, wherein the composite risk score comprises a plurality of risk scores corresponding to a plurality of different future time periods including the future time period.

4. The method of claim 1, further comprising:
training, by the computing system, the prediction classifier based on past interruption data collected by the computing system.

5. The method of claim 1, further comprising:
training, by the computing system, the prediction classifier based on a combination of past interruption data of live containers on spare cloud resources and past interruption data of denied containers on spare cloud resources.

6. The method of claim 1, further comprising:
predicting, by the computing system before the rebalancing, that the spare cloud resource will be interrupted within the future time period based on a comparison of the risk score to a threshold.

7. The method of claim 1, further comprising:
retraining, by the computing system, the prediction classifier in response to a change in a number of interruptions over a window of time beyond a threshold number.

8. The method of claim 1, further comprising:
retraining, by the computing system, the prediction classifier based on data obtained from test containers requested on one or more spare cloud resources in one or more markets.

9. The method of claim 1, further comprising:
periodically running the prediction classifier to update the risk score.

10. A computing device comprising:
a memory containing machine readable medium comprising machine executable code having stored thereon instructions for performing a method of predicting interruptions to use of a spare cloud resource;
a processor coupled to the memory, the processor configured to execute the machine executable code to cause the processor to:
apply a prediction classifier on spare cloud resource data associated with the spare cloud resource, on which a container is scheduled to run;
generate, in response to the application of the prediction classifier on the spare cloud resource data, a risk score, wherein the risk score identifies a risk of an interruption occurring within a future time period to the container running on the spare cloud resource, wherein the risk score comprises a live interruption risk score component corresponding to a first risk of the container on the spare cloud resource being interrupted and a denied scheduling risk score component corresponding to a second risk of the container being denied to launch on the spare cloud resource; and
rebalance the container from the spare cloud resource to another cloud resource automatically based on a prediction of the interruption occurring determined from the risk score.

11. The computing device of claim 10, wherein the risk score comprises a composite risk score, wherein the composite risk score comprises a set of risk scores corresponding to a plurality of different future time periods of different lengths including the future time period.

12. The computing device of claim 10, wherein the processor is further configured to:
train the prediction classifier on a sample set of prior interruption data collected for a market in which the spare cloud resource is available.

13. The computing device of claim 10, wherein the processor is further configured to:
retrain the prediction classifier based on a modification to a sample set of prior interruption data on which the prediction classifier had been trained previously.

14. The computing device of claim 10, wherein the processor is further configured to:
predict the interruption occurring within the future time period based on the risk score exceeding a threshold.

15. The computing device of claim 10, wherein the processor is further configured to execute the machine executable code to cause the processor to:
periodically run the prediction classifier to update the risk score.

16. A non-transitory machine readable medium having stored thereon instructions for performing a method of predicting interruptions to use of a spare cloud resource, comprising machine executable code which when executed by at least one machine, causes the machine to:
generate, in response to application of a prediction classifier on spare cloud resource data associated with the spare cloud resource, a risk score that identifies a risk of an interruption occurring within a future time period to a container scheduled to run on the spare cloud resource, wherein the risk score comprises a live interruption risk score component corresponding to a first risk of the container on the spare cloud resource being interrupted and a denied scheduling risk score component corresponding to a second risk of the container being denied to launch on the spare cloud resource;
store the risk score to a database containing a plurality of risk scores; and recommend, to a customer associated with the container, to rebalance the container to another cloud resource in response to the risk score exceeding a threshold.

17. The non-transitory machine readable medium of claim 16, wherein the risk score comprises a composite risk score, wherein the composite risk score comprises the plurality of risk scores corresponding to a plurality of different future time periods of different lengths including the future time period.

18. The non-transitory machine readable medium of claim 16, further comprising machine executable code that causes the machine to:
   train the prediction classifier based on a combination of past interruption data of live containers on spare cloud resources and past interruption data of denied containers on spare cloud resources.

19. The non-transitory machine readable medium of claim 16, further comprising machine executable code that causes the machine to:
   retrain the prediction classifier based on a modification to a sample set of prior interruption data on which the prediction classifier had been trained previously.

20. The non-transitory machine readable medium of claim 16, further comprising machine executable code that causes the machine to:
   periodically run the prediction classifier to update the risk score.

* * * * *